(12) United States Patent
Pomet et al.

(10) Patent No.: US 7,319,758 B2
(45) Date of Patent: Jan. 15, 2008

(54) ELECTRONIC DEVICE WITH ENCRYPTION/DECRYPTION CELLS

(75) Inventors: Alain Pomet, Rousset (FR); Bernard Plessier, Meyreuil (FR); Laurent Sourgen, Aix en Provence (FR)

(73) Assignee: STMicroelectronics SA, Montrouge (FR)

( * ) Notice: Subject to any disclaimer, the term of this patent is extended or adjusted under 35 U.S.C. 154(b) by 856 days.

(21) Appl. No.: 09/727,300

(22) Filed: Nov. 30, 2000

(65) Prior Publication Data

US 2001/0003540 A1    Jun. 14, 2001

(30) Foreign Application Priority Data

Nov. 30, 1999  (FR) .................................. 99 15115

(51) Int. Cl.
*H04L 9/00*     (2006.01)
*G06F 11/30*   (2006.01)
*G06F 1/04*     (2006.01)
*G06F 3/00*     (2006.01)

(52) U.S. Cl. ...................... 380/260; 380/262; 380/277; 380/44; 713/150; 713/171; 713/189; 713/193; 713/600; 710/15

(58) Field of Classification Search ................ 380/260, 380/265; 713/183, 185, 200–202
See application file for complete search history.

(56) References Cited

U.S. PATENT DOCUMENTS 5,325,430 A * 6/1994 Smyth et al. ................ 713/192
5,448,045 A * 9/1995 Clark .......................... 235/382
5,552,776 A * 9/1996 Wade et al. ................ 340/5.74
5,867,579 A    2/1999 Saito ........................... 380/25
6,014,446 A * 1/2000 Finkelstein .................. 380/46
6,058,481 A * 5/2000 Kowalski .................... 713/201
6,072,875 A * 6/2000 Tsudik ........................ 380/270
6,501,390 B1* 12/2002 Chainer et al. ........ 340/870.16
6,714,648 B2* 3/2004 Miyazaki et al. ............. 380/30
6,748,410 B1* 6/2004 Gressel et al. .............. 708/491
6,865,672 B1* 3/2005 Carmeli ...................... 713/155

FOREIGN PATENT DOCUMENTS

GB        2414145 A   * 11/2005
WO    WO03081829 A2  * 10/2003

OTHER PUBLICATIONS

Peyret et al, Smart Cards Provide Very High Security and Flexibility in Subscribers Management, 1990, IEEE, pp. 744-752.*

(Continued)

*Primary Examiner*—Ayaz Sheikh
*Assistant Examiner*—Aravind K Moorthy
(74) *Attorney, Agent, or Firm*—Lisa K. Jorgenson; Allen, Dyer, Doppelt, Milbrath & Gilchrist, P.A.

(57) ABSTRACT

In an electronic component including a two-way bus through which data elements travel between peripherals and a central processing unit at the rate of a clock signal, the central processing unit and at least one of the peripherals each includes a data encryption/decryption cell. Each data encryption/decryption cell uses the same secret key. The secret key is produced locally at each clock cycle in each cell from a random signal synchronous with the clock signal, and is applied to each of the cells by a one-way transmission line.

38 Claims, 6 Drawing Sheets

OTHER PUBLICATIONS

Chang et al, Remote Password Authentication with Smard Cards, 1992, IEEE, p. 372.*

Anonymous, Smart Cards, 1998, Retail Delivery Strategies, pp. 5-27.*

Farrow, Rik, The Secure Future of Smart Cards, 1999, Network Magazine, pp. 84 and 86.*

* cited by examiner

ELECTRONIC DEVICE WITH ENCRYPTION/DECRYPTION CELLS

FIELD OF THE INVENTION

The present invention relates to electronic devices, and, more particularly, to an electronic security component in which sensitive information is processed.

BACKGROUND OF THE INVENTION

Electronic security components processing sensitive information are used especially in smart cards. Applications of these cards include accessing banks for banking applications, and for remote payments for television, gasoline distribution and highway tolls, for example. These electronic security components have to process confidential data that must be shielded against any attempt at espionage for fraudulent purposes. The confidential data travels through the data bus of the component between a central processing unit (processor) and peripherals, such as memories.

Different methods can be implemented to discover these confidential data elements. In particular, one physical characteristic that can be observed external the electronic component is its current signature which depends on the passage of data in transit on the data bus. The data bus has a high capacity because it circulates throughout the component.

For this reason, the output interface includes three-state selection switches sized to let through high current for charging or discharging the line capacitor. Since the data bus is an 8-bit data bus, it includes eight large selector switches that are activated to apply a data element to this bus. Consequently, there is high current consumption during the selection switching of the switches.

SUMMARY OF THE INVENTION

In view of the foregoing background, it is an object of the present invention to prevent the identification of data elements traveling through the bus or at least make this identification difficult.

It is another object of the present invention to use data encryption to improve the protection of confidential data.

Yet another object of the present invention is to implement data encryption at low cost whether in terms of silicon surface area, connection lines between the peripherals and the central processing unit, or data-processing time.

Another object of the present invention is to implement a data encryption system that can be adapted to all classes of components in a relatively straight forward manner without extra cost of customized design.

In view of these and other objects, advantages and features, one approach is to provide a component whose central processing unit and peripherals, which have to process sensitive data received or transmitted on the data bus, each comprise an encryption/decryption cell. Each encryption/decryption cell applies the same secret key produced locally by each cell at each clock cycle to a data element received or to be transmitted in the clock cycle.

Using the convention according to a clock cycle starting at the high level, the writing of a data element of the bus is done at the low level and the reading of a data element on the bus is done on the leading edge. Thus, in a given clock cycle, a data element may be encrypted with a secret key produced by the cell of a sender and transmitted on the bus during the write period on the bus. This encrypted data element may be read by an addressee and decrypted in the cell of this addressee with the secret key locally produced by this cell.

The two locally produced secret keys have the particular feature of being identical. Thus, according to the invention, the secret key is produced locally in each cell from a synchronous random signal applied to all. This is done in one clock cycle for the encryption of a data element given by a sender, and for the decryption of this data element encrypted by an addressee.

The present invention therefore relates to an electronic component comprising a two-way bus through which data elements travel in transit between peripherals and a central processing unit at the rate of a clock signal. The central processing unit and at least one of the peripherals each comprises a data encryption/decryption cell using the same secret key. A current value of the secret key is produced locally in each cell at each clock cycle from a random signal synchronous with the clock signal, and is applied to each of the cells by a one-way transmission line.

BRIEF DESCRIPTION OF THE DRAWINGS

Other features and advantages of the invention shall be described in detail in the following description by way of a non-restricted indication and with reference to the appended figures, of which.

DETAILED DESCRIPTION OF THE PREFERRED EMBODIMENTS

Figure 1:
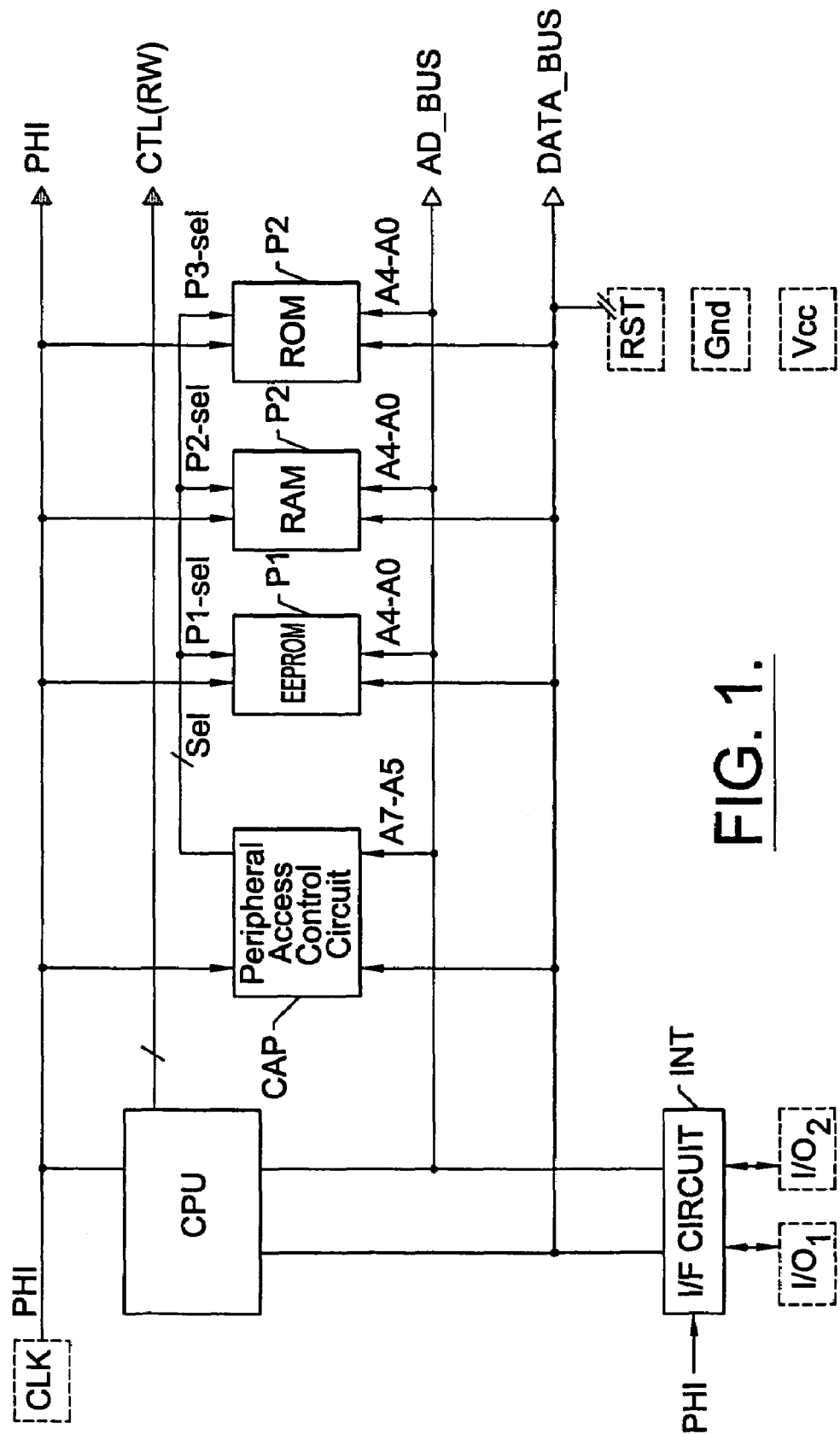
FIG. 1 shows an exemplary architecture of an electronic component to which the present invention can be applied.

FIG. 1 shows an exemplary architecture of an electronic security component to which the present invention can be applied. In this example, the electronic component is more particularly designed for smart card type applications. Its external connections are thus limited to two series-connected input/output pads, a clock pad CALK to receive an external clock signal, a pad to receive a resetting signal RST, and the logic supply pads Vcc and Gnd.

The architecture of this component comprises a central processing unit CPU and peripherals P1, P2, P3 which, in the example, are respectively a nonvolatile memory (e.g., an EEPROM type), a RAM type working memory, and a ROM type program memory. An interface circuit INT provides the interface between the serial input/output pads and the parallel bus of the component which is subdivided into an address bus AD-BUS, and a data bus DATA-BUS to which the central processing unit and the peripherals are connected.

In this architecture, it is also planned to have a circuit CAP for access control to the peripheral which receives the most significant bits A7-A5 from the address bus AD-BUS.

It contains a space allocation table for the physical addressable space of the component and gives especially the selection signals P1-sel, P2-sel and P3-sel of the peripherals P1, P2, P3 as a function of the decoded address. In this example, the peripherals receive only the least significant bits A5-A0 from the address bus.

Depending on the instructions that the central processing unit receives externally, it gives control signals CTL, especially a read/write signal RW, to be applied to the peripherals. Finally, the pad CALK gives the clock signal PHI applied to all the circuits of the component. That is, the clock signal PHI is applied to the central processing unit, the peripherals, the interface circuit, and the peripheral access control circuit in the example.

Figure 2:
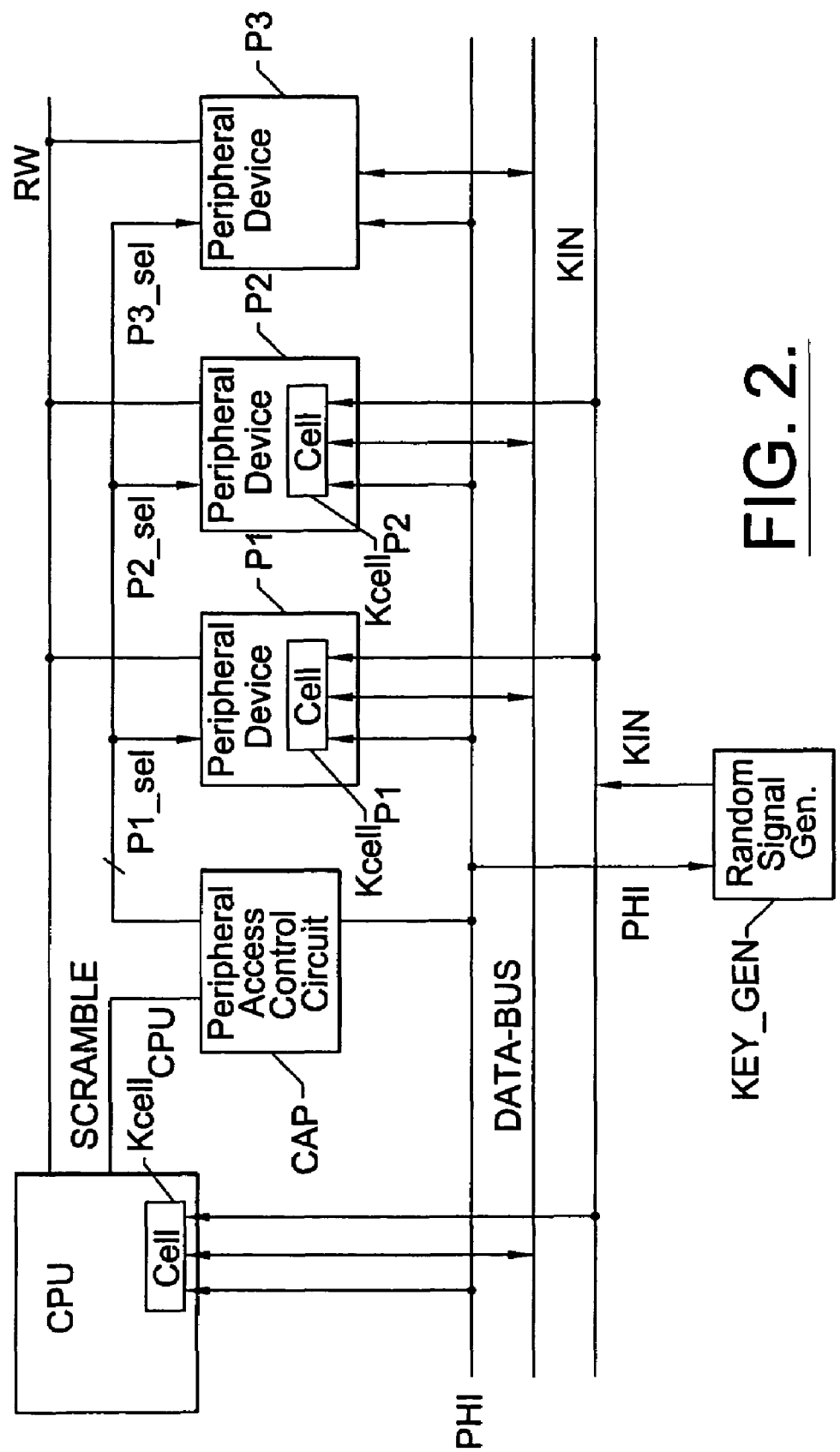
FIG. 2 shows a simplified architecture of an electronic component according to the present invention.

In the invention, it is sought to secure this circuit by preventing the determining of the data elements that travel through the internal data bus DATA-BUS through observation of the current consumption of the component. Thus, as shown in FIG. 2 in a simplified representation of the architecture of the component of FIG. 1, an encryption/decryption cell is placed in the central processing unit and in each of the peripherals that read or write sensitive data on the data bus, i.e., in the peripherals P1 and P2. These cells are referenced $Kcell_{CPU}$, $Kcell_{P1}$ and $Kcell_{P2}$ in FIG. 2.

The electronic component according to the invention then comprises a random signal generator KEY_GEN synchronized with a clock signal on a one-way transmission line to apply this signal to each of the encryption/decryption cells planned in the component. Each of these cells is furthermore connected to the input/output of the data bus DATA-BUS.

Figure 3:
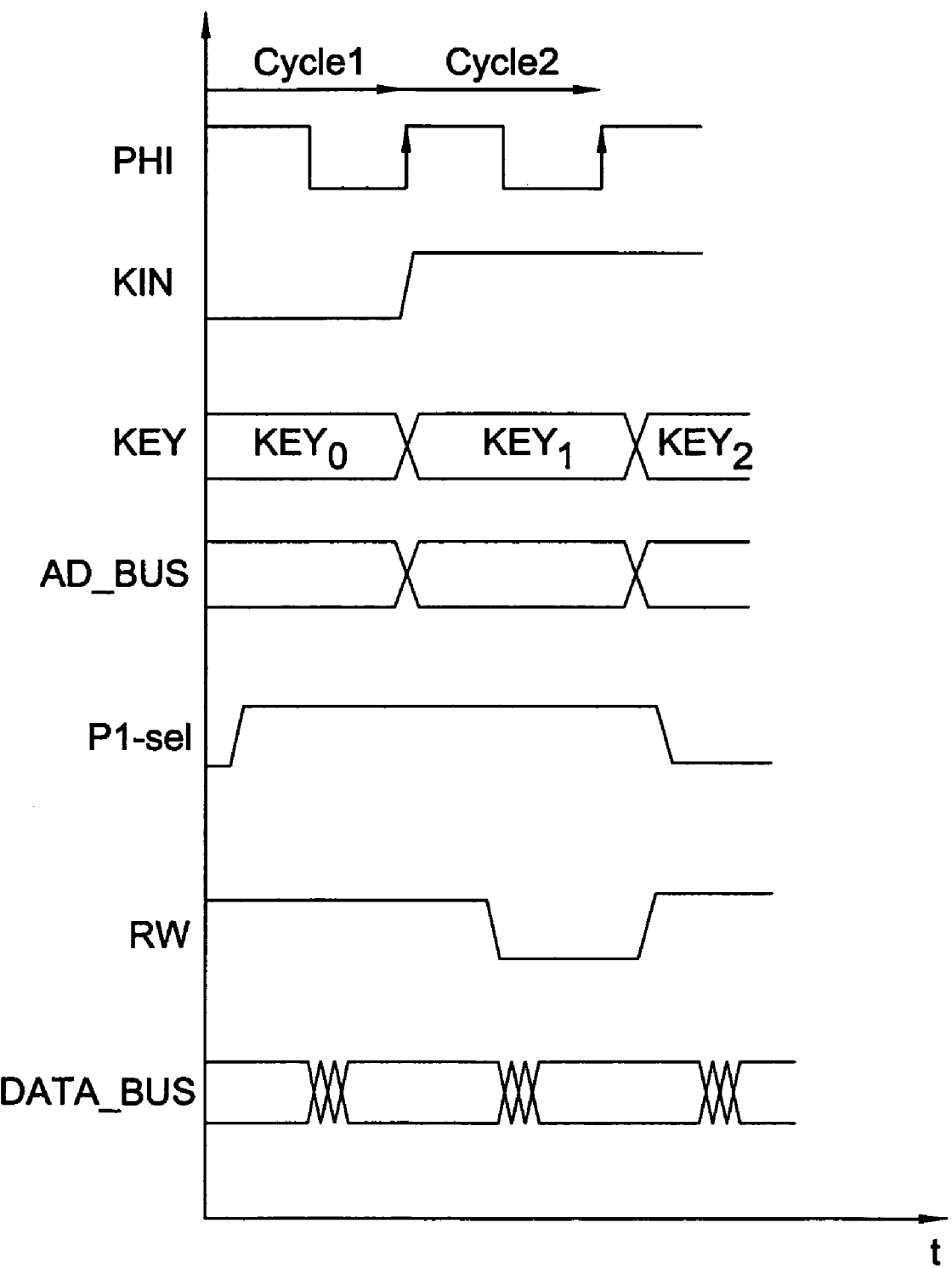
FIG. 3 is an exemplary timing diagram of the data and control signals of the electronic component shown in FIG. 2.

FIG. 3 shows a timing diagram corresponding to a read operation in which the central processing unit reads a data element of the peripheral P1 followed by a write operation in which the central processing unit writes the data element in the peripheral P1. This timing diagram illustrates the principle of the invention.

This timing diagram shows two clock cycles referenced cycle 1 and cycle 2, the synchronous random signal $K_{IN}$, the secret key KEY computed locally in each cell, the address bus AD-BUS, the selection signal P1-sel of the peripheral P1, the read/write control signal RW whose low level corresponds to a write command and whose high level corresponds to a read command (by convention), and the data bus DATA-BUS. Considering the first clock cycle shown (cycle 1), it has a corresponding value $KEY_0$ of the secret key that is computed locally in each cell from the new input value of the random signal $K_{IN}$, which is 0 in the example.

The peripheral P1 is selected (P1-sel at the high level) in read mode (RW at the high level) at the address applied to the address bus AD-BUS. The cell $Kcell_{P1}$ of peripheral P1 gives on the bus the data element read at this address, which is encrypted with the current value of the secret key $KEY_0$ that is locally computed by this cell $Kcell_{P1}$. This data element is transmitted on the bus on the low level of the cycle 1 of the clock signal. The encrypted data element is stored in an input register of the central processing unit CPU on the leading edge of the cycle 1 of the clock signal, and decrypted by the cell $Kcell_{CPU}$ with the current value $KEY_0$ of the secret key locally computed by this cell $Kcell_{CPU}$.

Considering the second clock cycle shown (cycle 2), it has a corresponding value $KEY_1$ of the secret key locally computed in each cell from the new input value of the random key $K_{IN}$, which is 1 in the example. The peripheral P1 is selected (P1-sel at the high level) in write mode (RW at the low level) at the address applied to the address bus AD-BUS. The cell $Kcell_{CPU}$ of the central processing unit gives on the bus the data element to be written at this address, which is encrypted with the current value of secret key $KEY_1$ that is locally computed by this cell $Kcell_{CPU}$. This data element is transmitted on the bus on the low level of the cycle 2 of the clock signal. The encrypted data element is stored in an input register of the peripheral P1 on the leading edge of the cycle 2 of the clock signal, and decrypted by the cell $Kcell_{P1}$ with the current value $KEY_1$ of the secret key locally computed by this cell $Kcell_{P1}$.

Figure 4:
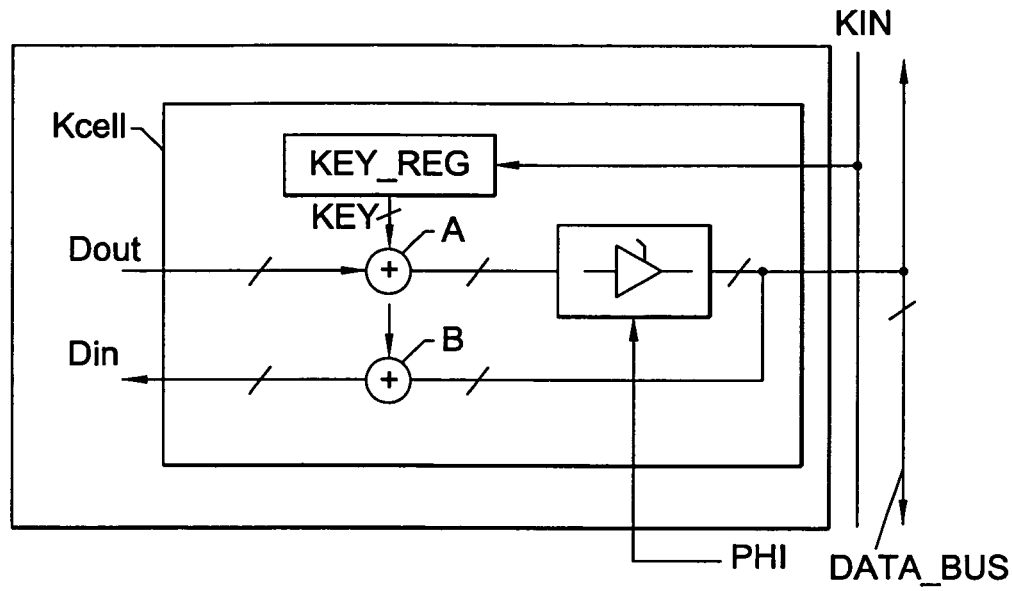
FIG. 4 is a block diagram of an encryption/decryption cell according to the present invention.

A general block diagram of an encryption/decryption cell Kcell according to the invention is shown in FIG. 4. This cell is such that it locally computes the current value of the secret key used both for encryption and for decryption. The cell Kcell has a register KEYREG that gives the secret key KEY for the encryption and decryption. It is an n-stage shift register sequenced by the clock signal PHI and receives the random data signal $K_{IN}$ at input synchronous with the clock signal PHI. The register KEYREG gives the current value of the secret key KEY at output for the current clock cycle, whose value is a polynomial function of the n most recent values of the random signal $K_{IN}$. The secret key thus takes a new random value at each clock cycle.

The register is preferably a feedback shift register. That is to say, it has combinational logic gates to apply the output bit of certain stages to the input of other stages of the register. This makes it possible to obtain valuable polynomial functions. Preferably, an irreducible polynomial function is implemented to improve the resistance of the encryption.

The cell Kcell has an encryption module A and a decryption module B to which the secret key KEY given by the register KEYREG of the cell is applied. In the example, the mathematical function implemented in the encryption module is the XOR function which has the particular feature of being also the function to be applied in the decryption module and of being easy to implement.

The encryption module A receives inter alia an internal data element Dout from the circuit in which the cell Kcell is placed and the secret key KEY produced locally by the register KEYREG. At output, it delivers an encrypted data element applied to the data bus DATA-BUS through the output interface of the circuit, which is symbolically shown in the figure by a controlled inverter.

Figure 5:
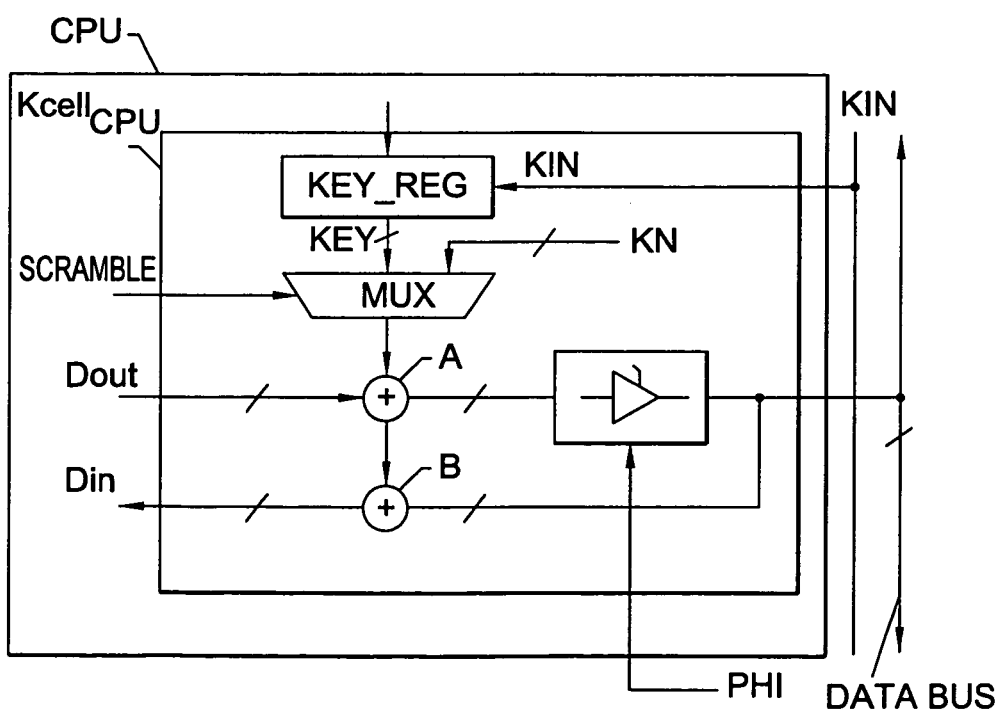
FIG. 5 shows the encryption/decryption cell comprising a conditional circuit applicable to the central processing unit according to the present invention.

The decryption module B receives a data element from the data bus and the secret key KEY locally produced by the register KEYREG. At output, it gives a decrypted data element Din. In one improvement shown in FIG. 5, the encryption/decryption cell of the central processing unit comprises, in addition to the elements described here above, a conditional circuit used for the application to the encryption and decryption modules of either the secret key KEY or a neutral key KN corresponding to the neutral value for the encryption operation considered. In the exemplary XOR operation, this neutral value is the zero value.

This improvement is used to avoid implementing an encryption/decryption cell in all the circuits connected to the data bus in the component considered, and is implemented in only those cells that handle data elements to be protected. It is therefore planned that the control circuit PAC for access to the peripherals (shown in FIGS. 1 and 2) will give an encryption enabling signal SCRAMBLE to the central processing unit CPU whenever it decodes the address of a peripheral of this kind. In practice, this access control circuit finds this information in its physical address allocation table.

It will be noted that the information SCRAMBLE in the example given by the access control circuit is placed outside or external the central processing unit in the exemplary architecture shown in FIGS. 1 and 2. This is not absolutely restrictive. The information SCRAMBLE is more generally given by an address decoding circuit of the component.

The conditional circuit of the cell $Kcell_{CPU}$ according to the improvement of the invention comprises a multiplexer MUX receiving the secret key KEY and the neutral key KN at input. At output, this conditional circuit gives the key selected by the encryption enabling signal SCRAMBLE, which is applied to the encryption and decryption modules of this cell $Kcell_{CPU}$.

Figure 6:
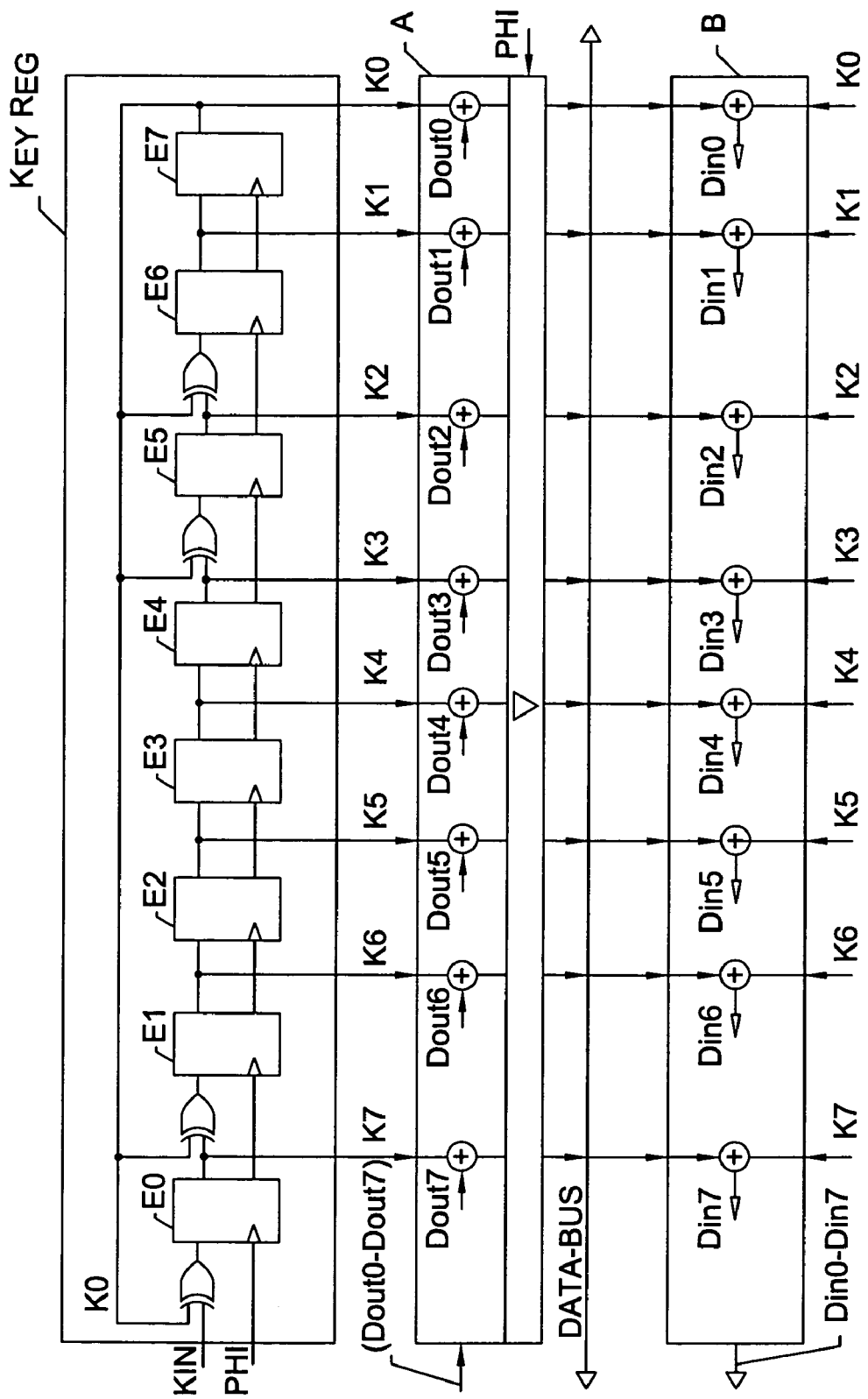
FIG. 6 is a detailed drawing of the encryption and decryption circuits in the cell according to the present invention.

FIG. 6 gives a slightly more detailed view of an encryption/decryption cell according to the present invention. If we consider an 8-bit data bus, the secret key must include at least as many bits. The register K$_{EY}$R$_{EG}$ has eight stages to give eight secret key bits referenced K0 to K7. Each of these eight data bits is applied in the encryption module A, and in the decryption module B to a corresponding XOR gate receiving the same-order data bit to be encrypted or decrypted at input. Each of these modules thus comprises eight XOR gates, one per bit.

This figure shows an exemplary embodiment of a shift type feedback register K$_{EY}$R$_{EG}$. The references E0 to E7 designate the eight stages of the register, respectively giving the bits K7 to K0 of the secret key. These stages may be D-type flip-flop circuits, for example.

In the exemplary embodiment shown, the stage E0 receives at input the random signal K$_{IN}$ combined in an XOR gate with the bit K0 given by the last stage E7 of the register, and at output it delivers the bit K7. The stage E1 receives at input the bit K7 combined in an XOR gate with the bit K0. At output it delivers the bit K6. The stages E2, E3 and E4 receive at input the bits given by the preceding stage, and deliver at output the bits K5, K4 and K3 respectively. The stage E5 receives the bit K3 at input which is combined in an XOR gate with the bit K0, and delivers the bit K2 at output. This stage E6 receives the bit K2 at input which is combined in an XOR gate with the bit K0, and delivers the bit K1 at output. The stage E7 receives the bit K1 at input and delivers the bit K0 at output.

Figure 7:
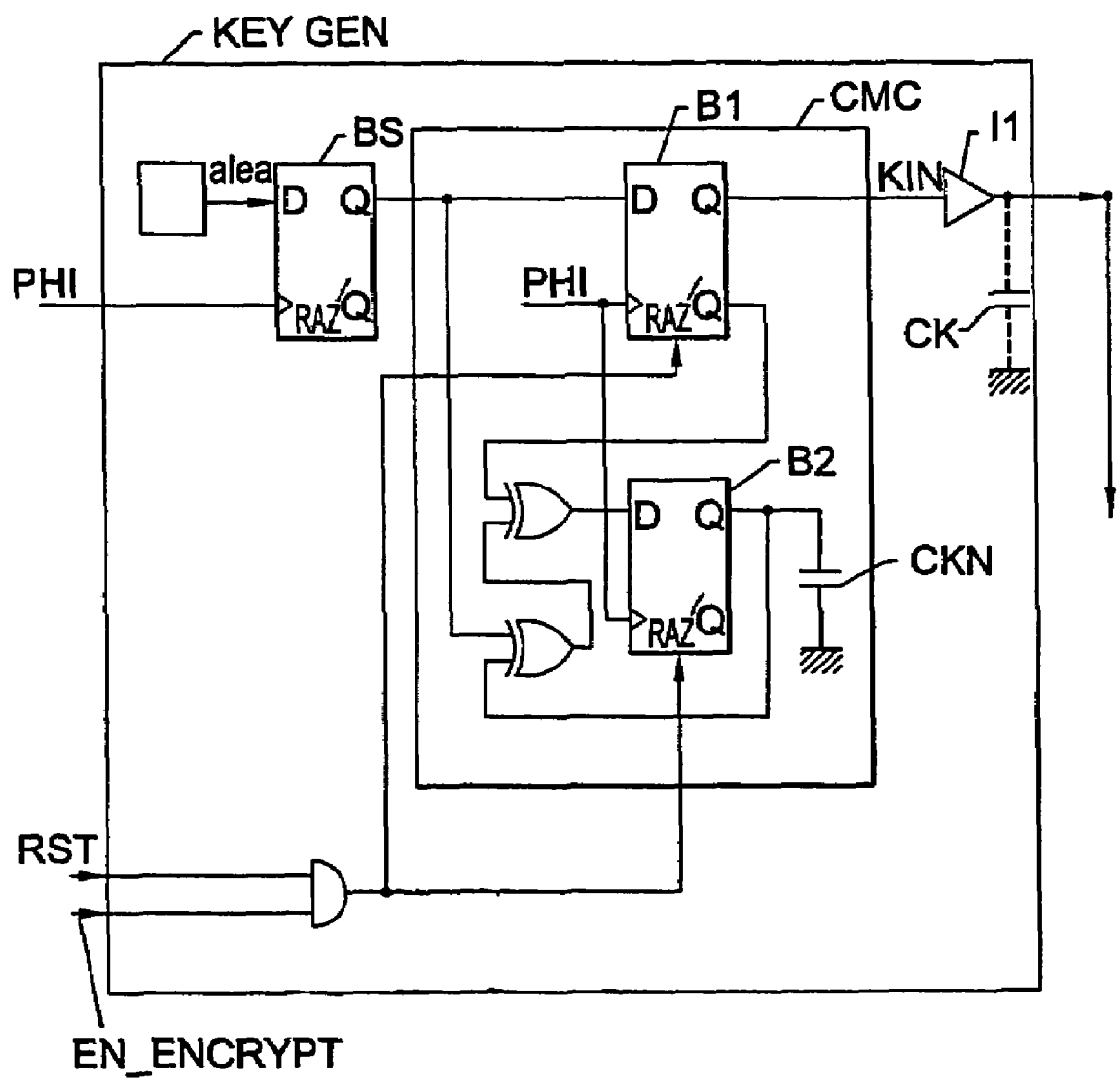
FIG. 7 is a block diagram of a synchronous random signal generator that can be used in the present invention.

FIG. 7 represents an exemplary generator KEYGEN of the random signal K$_{IN}$. In this example, the generator comprises a pseudo-random generator to give a random clock signal that is applied to the D input of a flip-flop circuit BS to be synchronized by the clock signal PHI. This flip-flop circuit therefore receives the clock signal PHI at its clock input, and gives at its Q output a random signal K$_{IN}$ that is synchronized with the clock signal PHI.

It is very difficult in principle to determine the value taken by the random signal by observing the power consumption of the component arising from the switching operations on the transmission line of the synchronous random signal K$_{IN}$ because the capacitance of this one-way line is very low. However, in one improvement of the invention, it is planned that the generator of the synchronous random signal will comprise a circuit CMC for masking the consumption due to the selection switching operations on this transmission line. In the example, this circuit CMC is connected between the output of the synchronization flip-flop circuit BS and the transmission line.

There are different consumption masking circuits of varying degrees of efficiency. An exemplary non-exhaustive embodiment is shown in FIG. 7. It has two D-type flip-flop circuits, B1 and B2. The first flip-flop circuit B1 receives the Q output of the synchronization flip-flop circuit BS as a data input, and the clock signal from the bus PHI as a clock input. The Q output is connected by an interface element (driver) I1 to the transmission line.

The complementary /Q output of the flip-flop circuit B1 is applied to a combinational circuit whose output S is applied to the data input of the second flip-flop circuit B2. The Q output of this second flip-flop circuit B2 is connected to a capacitor CKN whose capacitance corresponds to the parasitic capacitance CK of the transmission line perceived by the output interface I1 of the generator KEYGEN.

The combinational circuit, in the example, has a first OR gate receiving the Q outputs of the synchronization flip-flop circuit and of the second flip-flop circuit B2 as inputs. A second OR gate receives the output of the first gate and the complementary output /Q of the first flip-flop circuit B1 as inputs. With a combinational circuit of this kind, complementary transitions are obtained in the flip-flop circuits B1 and B2 so that the same consumption due to the transmission of the signal K$_{IN}$ is observed at each clock cycle.

In another improvement of the invention, it is planned that the random signal K$_{IN}$ will be transmitted on the transmission line only after activation by the central processing unit of an encryption activation signal E$_N$E$_{NCRYPT}$. This can be done simply by forcing the resetting of the flip-flop circuits.

FIG. 7 thus shows an AND type logic gate receiving, as inputs, the resetting signal RST of the component which is active at zero, and the enabling signal E$_N$-E$_{NCRYPT}$. This signal is at zero by default. Thus, so long as the enabling signal is at zero after the setting, the flip-flop circuits B1 and B2 are set at zero, and the transmission line is set at zero. As soon as it is set at 1 by the central processing unit, the random signal is sent.

It will be noted that the two improvements of the generator of the synchronous random signal, namely the masking of consumption and the enabling of encryption, can be implemented independently of each other. Thus, in certain components, it is possible to implement only one of these improvements. To this end, it will be noted that the improvement relating to encryption enabling can be implemented independently of the masking circuit. For example, this may be done using an AND logic gate receiving the synchronous random signal K$_{IN}$ and the activation signal E$_N$-E$_{NCRYPT}$ as inputs, and connected at output to the transmission line.

The use of encryption/decryption cells according to the invention thus gives efficient protection for sensitive data. This protection costs little in terms of design, implementation and processing time for the component. In particular, the design is facilitated by the user of encryption/decryption cells that are identical in all the peripherals.

The encryption/decryption cell of the central processing unit comprises an encryption-enabling option by which it is possible not to implant a cell necessarily in all the peripherals. The random signal generator has two embodiment options, which are a consumption masking option and an encryption/decryption activation option.

That which is claimed is:

1. An electronic device comprising:
   a central processing unit;
   at least one peripheral device;
   a data bus connected between said at least one peripheral device and said central processing unit through which data travels at a rate of a clock signal; and
   a transmission line connected between said at least one peripheral device and said central processing unit for providing a random signal thereto that is synchronous with the clock signal;
   said central processing unit and said at least one peripheral device each comprising a data encryption/decryption cell connected to said data bus and to said transmission line for generating a same current secret key at each clock cycle based upon the random signal.

2. An electronic device according to claim 1, wherein said at least one peripheral device comprises a memory.

3. An electronic device according to claim 1, wherein the same current secret key changes at each successive clock cycle.

4. An electronic device according to claim 1, wherein each data encryption/decryption cell comprises a shift register having an input for receiving the random signal and an input for receiving the clock signal, and an output for providing the same current secret key at each clock cycle.

5. An electronic device according to claim 4, wherein said shift register comprises a feedback type shift register.

6. An electronic device according to claim 4, wherein said shift register performs a polynomial function based upon n most recent values of the random signal.

7. An electronic device according to claim 1, wherein each data encryption/decryption cell comprises:
an encryption module having an input for receiving the secret key and an input for receiving the data to be transmitted, and an output for providing encrypted data; and
a decryption module having an input for receiving the secret key and an input for receiving the data, and an output for providing decrypted data.

8. An electronic device according to claim 7, wherein the data encryption/decryption cell of said central processing unit further comprises a conditional circuit for applying the secret key or a neutral key to said encryption and decryption modules based upon an encryption enabling signal.

9. An electronic device according to claim 8, further comprising a peripheral access control circuit connected to said central processing unit and said at least one peripheral device for generating the encryption enabling signal based upon an address of said at least at least one peripheral device.

10. An electronic device according to claim 7, wherein said encryption module and said decryption module each operate based upon a same mathematical function.

11. An electronic device according to claim 1, further comprising a random signal generator connected to said transmission line for generating the random signal that is synchronous with the clock signal, and wherein said random signal generator further comprises a consumption masking circuit.

12. An electronic device according to claim 11, wherein said random signal generator comprises a D-type flip-flop having an input for receiving a random binary signal and an input for receiving the clock signal, and an output for providing the random signal; and wherein said consumption masking circuit is connected between the output of said D-type flip-flop circuit and said transmission line.

13. An electronic device according to claim 11, wherein a value of the same current secret key on said transmission line is set to zero by default by said central processing unit, and said random signal generator comprises a logic circuit to transmit the random signal on said transmission line after activation of a control signal by said central processing unit.

14. An electronic device comprising:
a central processing unit;
at least one memory device;
a data bus connecting said at least one memory device and said central processing unit; and
a transmission line connecting said at least one memory device and said central processing unit for providing a random signal thereto that is synchronous with a clock signal;
said central processing unit and said at least one memory device each comprising a data encryption/decryption cell connected to said data bus and to said transmission line for generating a same current secret key at each cycle of the clock signal based upon the random signal.

15. An electronic device according to claim 14, wherein each data encryption/decryption cell comprises a shift register having an input for receiving the random signal and an input for receiving the clock signal, and an output for providing the same current secret key at each cycle of the clock signal.

16. An electronic device according to claim 15, wherein said shift register performs a polynomial function based upon n most recant values of the random signal.

17. An electronic device according to claim 14, wherein each data encryption/decryption cell comprises:
an encryption module having an input for receiving the secret key and an input for receiving the data to be transmitted, and an output for providing encrypted data; and
a decryption module having an input for receiving the secret key and an input for receiving the data, and an output for providing decrypted data.

18. An electronic device according to claim 17, wherein the data encryption/decryption cell of said central processing unit further comprises a conditional circuit for applying the secret key or a neutral key to said encryption and decryption modules based upon an encryption enabling signal.

19. An electronic device according to claim 18, further comprising a memory access control circuit connected to said central processing unit and said at least one memory device for generating the encryption enabling signal based upon an address of said at least at least one memory device.

20. An electronic device according to claim 17, wherein said encryption module and said decryption module each operate based upon a same mathematical function.

21. An electronic device according to claim 14, further comprising a random signal generator connected to said transmission line for generating the random signal that is synchronous with the clock signal, and wherein said random signal generator further comprises a consumption masking circuit.

22. An electronic device according to claim 14, wherein said random signal generator comprises a D-type flip-flop having an input for receiving a random binary signal and an input for receiving the clock signal, and an output for providing the random signal; and wherein said consumption masking circuit is connected between the output of said D-type flip-flop circuit and said transmission line.

23. A smart card comprising:
a central processing unit;
at least one peripheral device;
a data bus connecting said at least one peripheral device and said central processing unit;
a transmission line connecting said at least one peripheral device and said central processing unit; and
a random signal generator connected to said transmission line for generating a random signal thereon that is synchronous with a clock signal;
said central processing unit and said at least one peripheral device each comprising a data encryption/decryption cell connected to said data bus and to said transmission line for generating a same current secret key at each cycle of the clock signal based upon the random signal.

24. A smart card according to claim 23, wherein each data encryption/decryption cell comprises a shift register having an input for receiving the random signal and an input for receiving the clock signal, and an output for providing the same current secret key at each cycle of the clock signal.

25. A smart card according to claim 24, wherein said shift register performs a polynomial function based upon n most recent values of the random signal.

26. A smart card according to claim 23, wherein each data encryption/decryption cell comprises:
   an encryption module having an input for receiving the secret key and an input for receiving the data to be transmitted, and an output for providing encrypted data; and
   a decryption module having an input for receiving the secret key and an input for receiving the data, and an output for providing decrypted data.

27. A smart card according to claim 26, wherein the data encryption/decryption cell of said central processing unit further comprises a conditional circuit for applying the secret key or a neutral key to said encryption and decryption modules based upon an encryption enabling signal.

28. A smart card according to claim 27, further comprising a peripheral access control circuit connected to said central processing unit and said at least one peripheral device for generating the encryption enabling signal based upon an address of said at least at least one peripheral device.

29. A smart card according to claim 26, wherein said encryption module and said decryption module each operate based upon a same mathematical function.

30. A smart card according to claim 23, wherein said random signal generator comprises a D-type flip-flop having an input for receiving a random binary signal and an input for receiving the clock signal, and an output for providing the random signal; and wherein said consumption masking circuit is connected between the output of said D-type flip-flop circuit and said transmission line.

31. A method for exchanging data in an electronic device comprising a central processing unit and at least one peripheral device, a data bus connected between the at least one peripheral device and the central processing unit, and a transmission line connected between the at least one peripheral device and the central processing unit, the method comprising:
   providing a random signal to the central processing unit and to the at least one peripheral device; and
   generating a same current secret key at each cycle of a clock signal based upon the random signal in the central processing unit and the at least one peripheral device.

32. A method according to claim 31, wherein the at least one peripheral device comprises a memory device.

33. A method according to claim 31, wherein each data encryption/decryption cell comprises a shift register having an input for receiving the random signal and an input for receiving the clock signal, and an output for providing the same current secret key at each cycle of the clock signal.

34. A method according to claim 33, wherein the shift register performs a polynomial function based upon n most recent values of the random signal.

35. A method according to claim 31, wherein each data encryption/decryption cell comprises:
   an encryption module having an input for receiving the secret key and an input for receiving the data to be transmitted, and an output for providing encrypted data; and
   a decryption module having an input for receiving the secret key and an input for receiving the data, and an output for providing decrypted data.

36. A method according to claim 35, wherein the data encryption/decryption cell of the central processing unit further comprises a conditional circuit for applying the secret key or a neutral key to the encryption and decryption modules based upon an encryption enabling signal.

37. A method according to claim 36, further comprising a peripheral access control circuit connected to the central processing unit and the at least one peripheral device for generating the encryption enabling signal based upon an address of the at least at least one peripheral device.

38. A method according to claim 36, wherein the random signal is generated by a random signal generator connected to the transmission line.

* * * * *

UNITED STATES PATENT AND TRADEMARK OFFICE
CERTIFICATE OF CORRECTION

PATENT NO. : 7,319,758 B2  Page 1 of 1
APPLICATION NO. : 09/727300
DATED : January 15, 2008
INVENTOR(S) : Pomet et al.

It is certified that error appears in the above-identified patent and that said Letters Patent is hereby corrected as shown below:

| | |
|---|---|
| Column 7, Line 37 | Delete: "at least at least"<br>Insert: -- at least -- |
| Column 8, Line 18 | Delete: "recant"<br>Insert: -- recent -- |
| Column 8, Line 37 | Delete: "at least at least"<br>Insert: -- at least -- |
| Column 9, Line 30 | Delete: "at least at least"<br>Insert: -- at least -- |
| Column 10, Line 39 | Delete: "at least at least"<br>Insert: -- at least -- |
| Column 10, Line 40 | Delete: "36"<br>Insert: -- 31 -- |

Signed and Sealed this

Second Day of September, 2008

JON W. DUDAS
*Director of the United States Patent and Trademark Office*